(12) United States Patent
Joshua et al.

(10) Patent No.: US 10,268,395 B1
(45) Date of Patent: Apr. 23, 2019

(54) SYSTEMS AND METHODS FOR COMMUNICATING ADDRESSABLE REQUESTS TO A PROGRAMMABLE INPUT/OUTPUT MEMORY OVER A HARDWARE BRIDGE

(71) Applicant: MARVELL INTERNATIONAL LTD., Hamilton (BM)

(72) Inventors: Eitan Joshua, Ramot Menashe (IL); Oren Shafrir, Tel Aviv (IL); Hunglin Hsu, Cupertino, CA (US); Chia-Hung Chien, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/619,143

(22) Filed: Jun. 9, 2017

Related U.S. Application Data (60) Provisional application No. 62/347,774, filed on Jun. 9, 2016.

(51) Int. Cl.
    *G06F 3/06* (2006.01)
    *G06F 13/28* (2006.01)
    *G06F 12/0897* (2016.01)
    *G06F 12/0811* (2016.01)

(52) U.S. Cl.
    CPC .......... *G06F 3/0611* (2013.01); *G06F 3/0656* (2013.01); *G06F 3/0659* (2013.01); *G06F 3/0688* (2013.01); *G06F 12/0811* (2013.01); *G06F 12/0897* (2013.01); *G06F 13/28* (2013.01); *G06F 2212/1024* (2013.01); *G06F 2212/2022* (2013.01); *G06F 2212/261* (2013.01); *G06F 2212/283* (2013.01)

(58) Field of Classification Search
    CPC ...... G06F 5/16; G06F 3/0607; G06F 12/0893; G06F 13/28; G06F 3/0611; G06F 12/0897
    See application file for complete search history.

(56) References Cited

U.S. PATENT DOCUMENTS

| | | | | |
|---|---|---|---|---|
| 9,459,829 | B2* | 10/2016 | Shumsky | G06F 5/16 |
| 9,477,611 | B2* | 10/2016 | Sutardja | G06F 9/4406 |
| 9,489,304 | B1* | 11/2016 | Swarbrick | G06F 13/16 |
| 2010/0122027 | A1* | 5/2010 | Onabe | G06F 3/0607 |
| | | | | 711/114 |
| 2014/0372699 | A1* | 12/2014 | Desai | G06F 12/0893 |
| | | | | 711/118 |

* cited by examiner

*Primary Examiner* — Benjamin P Geib
*Assistant Examiner* — Getente A Yimer (57) ABSTRACT

Systems and methods described herein provide for communicating an addressable request from cache circuitry to a cache memory. The addressable request is received at a hardware bridge coupled to the cache circuitry and is directed to the cache memory, wherein the cache memory includes a direct memory access (DMA) memory and a programmable input/output (PIO) memory operable within a same address space of the cache circuitry. A service command associated with the addressable request is sent from the hardware bridge to a microcontroller. In response to receiving the service command, the microcontroller activates the PIO memory by: 1) transferring write data from an on-die memory to the PIO memory when the service command is a write command, and 2) transferring read data from the PIO memory to the on-die memory when the service command is a read command.

20 Claims, 6 Drawing Sheets

SYSTEMS AND METHODS FOR COMMUNICATING ADDRESSABLE REQUESTS TO A PROGRAMMABLE INPUT/OUTPUT MEMORY OVER A HARDWARE BRIDGE

CROSS-REFERENCE TO RELATED APPLICATIONS

This application claims priority under 35 U.S.C. § 119(e) to U.S. Provisional Patent Application No. 62/347,774, filed on Jun. 9, 2016, which is hereby incorporated by reference in its entirety.

FIELD OF USE

This disclosure relates to cache and memory operations, and in particular, to systems and methods for communicating addressable requests from a final level cache (FLC) to a memory in programmable input/output (PIO) mode over a hardware bridge. Both non-volatile memories (such as a Flash memory) and volatile memories (such as a dynamic random-access memory (DRAM) or a static random-access memory (SRAM)) may be used in FLC-based systems where embodiments described herein may be applied.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

In a System-on-Chip (SoC), caches within the SoC packaging are typically implemented as SRAM while caches and system memories external to the SoC packaging are typically implemented as DRAM or Flash. A program is usually transferred from a long-term storage (typically a non-volatile memory, such as Flash or Solid-State Drives) to the system memory for fast access. A central processing unit (CPU) fetches data or instructions associated with the program from the system memory in order to process them. To further speed up the processing time while these data or instructions are being processed, they are sometimes temporarily kept in one or more levels of caches for even quicker access by the CPU. Accordingly, if the CPU needs certain data, the CPU initially looks within the caches. In the event of a cache-miss, i.e., the data needed by the CPU does not exist within the cache, the CPU will move on to search within the system memory, followed by the long-term storage.

Many programs, applications, and processes are stored in the system memory when the CPU is not actively processing them. They remain idle in the system memory and take up expensive memory space. In addition, the system memory is usually implemented with volatile memory units, which require a constant supply of power to maintain the data stored therein. When the system memory includes a large DRAM, for example, the system also incurs significant power expenditure to maintain the data in the DRAM-based system memory.

SUMMARY

Embodiments described herein provide a method for communicating an addressable request from cache circuitry to a cache memory. The addressable request is received at a hardware bridge coupled to the cache circuitry and is directed to the cache memory, wherein the cache memory includes a direct memory access (DMA) memory and a programmable input/output (PIO) memory operable within a same address space of the cache circuitry. A service command associated with the addressable request is sent from the hardware bridge to a microcontroller. In response to receiving the service command, the microcontroller activates the PIO memory by 1) transferring write data from an on-die memory to the PIO memory when the service command is a write command, and 2) transferring read data from the PIO memory to the on-die memory when the service command is a read command.

In some implementations, the addressable request is received from a final-level cache. In some implementations, the read data or the write data are temporarily stored in the on-die memory to reduce latency in data transfer, wherein the on-die memory is a static random access memory coupled to the hardware bridge and the microcontroller.

In some implementations, a plurality of addressable requests from the cache circuitry is aggregated into a pool of outstanding addressable requests, wherein the plurality of addressable requests are associated with data within a same block of the PIO memory.

In some implementations, when the service command is the write command, the microcontroller stores the write data in the on-die memory and determines whether the write command fulfills a condition to activate the PIO memory. In response to determining that the condition is fulfilled, the hardware bridge sends an acknowledgement signal to the cache circuitry.

In some implementations, the addressable request and the acknowledgement signal are communicated between the hardware bridge and the cache circuitry on an AXI interface.

In some implementations, the condition to activate the PIO memory is fulfilled when sufficient data has accumulated for an Input/Output (I/O) block or when a timeout is met.

In some implementations, another read command is sent from the hardware bridge to the microcontroller in response to transferring the write data to the PIO memory. In some implementations, a write response is sent from the hardware bridge to the cache circuitry prior to the write data being completely transferred to the PIO memory.

In some implementations, a PIO memory controller retrieves the read data from the PIO memory and the microcontroller writes the read data to a designated location within the on-die memory.

In some implementations, the microcontroller receives a signal from the PIO memory controller, wherein the signal indicates completion of the transfer. In some implementations, the microcontroller writes to a register of the hardware bridge to indicate the completion of the transfer.

In some implementations, a central processing unit or a final-level cache module determines the addressable request is directed to the PIO memory based at least in part on a memory address included in the addressable request. In some implementations, the DMA memory is a dynamic random access memory and the PIO memory is a Flash memory.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for communicating addressable requests to a PIO memory over a hardware bridge in order to establish a uniform address space among caches and memories in both PIO and DMA modes.

As used herein, "cache" refers to one or more levels of small, usually volatile, memory blocks that are placed close to the CPU (sometimes, but not always, within the same SoC packaging as the CPU, i.e. "on-die"). "System memory" refers to larger memory blocks that are usually placed outside of the SoC packaging (i.e., "off-die"). Data accesses to a cache are usually much faster than data accesses to a system memory, but system memories have larger capacity to hold more programs, processes, and applications that are likely used by the CPU. In some implementations, the system memory is implemented with either a volatile or a non-volatile memory. The various types of system memories are also referred to herein as "secondary memories." In some embodiments, the caches are implemented as SRAM within the SoC packaging. In some embodiments, there are additional SRAM memory blocks (other than caches) within the SoC packaging as part of the FLC-based architecture, as will be made apparent in discussions below.

As used herein, a cache or memory in the PIO mode is also referred to as a PIO memory, and a cache or memory in the DMA mode is also referred to as a DMA memory.

In some implementations, a SoC that implements an FLC-based architecture is configured to operate with a combination of caches and system memory that consists of multiple tiers. For example, a SoC operates with a high-speed SRAM as a first tier cache, where crucial processes are run; a regular DRAM as a second tier cache, where non-crucial but frequently-accessed processes are run; and a non-volatile Flash memory as a third tier system memory, where the remaining processes and applications are stored. In another example, the SoC operates with a two-tier system memory: a DRAM for handling currently-processed tasks and a non-volatile Flash memory to store the remaining programs. Examples of FLC-based architectures are implemented with either volatile memories (e.g., SRAM and DRAM) or non-volatile memories (e.g., Flash). These and other exemplary implementations of FLC-based architectures are discussed in further detail in commonly-assigned U.S. Pat. No. 9,477,611, which is incorporated herein by reference in its entirety.

As described above, various systems employ different memory types as caches or system memories; hence, an FLC module needs to be able to communicate with the different memory types that are accessed in different manners. For example, to communicate with a DRAM, which is directly addressable by a CPU, the FLC module issues addressable cache requests (e.g., either read or write requests) to the DRAM directly to read data from or write data to a specific address in the DRAM. This is sometimes referred to as data access in the DMA mode ("direct memory access mode"). In another example, to communicate with a Flash memory, where addressable cache requests cannot be issued directly to read or write data, the FLC module issues commands to a device driver within a Flash controller, which activates the Flash memory to perform the read or write operation. In some instances, the Flash controller implements a DMA engine to read data from or write data to the Flash memory (not to be confused with the DMA mode of data access used for DRAM, as discussed above). In accordance with embodiments of the present disclosure, a uniform address space is established for various types of caches and memories, regardless of whether the cache or memory is accessed directly by a CPU (as is the case for DRAM, i.e., in DMA mode) or via a DMA engine in a controller (as is the case for Flash, i.e., in PIO mode).

Embodiments described herein present a hardware interface between a FLC module and one or more types of caches or memories (e.g., PIO memory and DMA memory). The hardware interface serves to bridge the FLC module to a PIO memory, so that the FLC module (and the CPU) is able to communicate with the PIO memory as if the latter is directly addressable. In some embodiments, an FLC module is configured to only issue addressable requests (e.g., via an on-die Advanced eXtensible Interface (AXI)) to access data in various levels of caches and system memories. During operation, for example, the FLC module first issues an addressable request to a DRAM-based cache, and in case of a cache-miss, issues another addressable request to a Flash memory. Because the Flash is not configured to process addressable requests directly, the hardware interface described herein is thus configured to translate the addressable requests into activation commands for a controller of a PIO memory, and supervise the read or write operation to completion without further intervention by a CPU.

In this way, the FLC-based architecture is able to operate with multiple types of caches and memories simultaneously, including, as discussed above, PIO memories and DMA memories, as if they belong to the same address space. In accordance with embodiments described herein, an FLC module is configured to send addressable cache requests into an interconnect without having to determine which memory a particular datum is stored at, what type of memory it is, or which activation command is needed for communicating with a PIO memory. Thus operational efficiency of the FLC is improved by the hardware interface as described herein.

Figure 1:
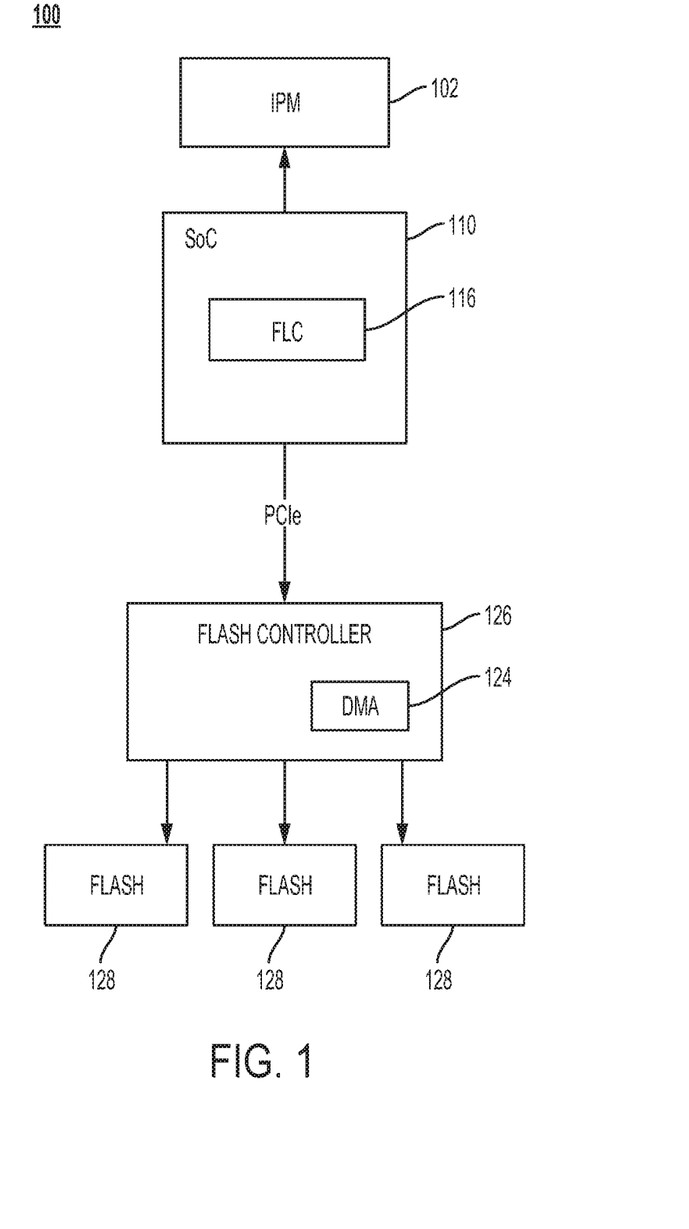
FIG. 1 is a block diagram illustrating an implementation of an FLC-based architecture for communicating with a memory structure in PIO mode, according to some embodiments described herein.

FIG. 1 shows a block diagram illustrating an implementation of an FLC-based architecture for communicating with a PIO memory, according to some embodiments described herein. System 100 includes in-package memory (IPM) 102, SoC 110, Flash controller 126, and a plurality of Flash memory blocks 128. In some embodiments, IPM 102 is located external to the SoC packaging, as is shown in system 100. In some other embodiments, IPM 102 is located within the SoC packaging of SoC 110.

In the implementation as shown in system 100, IPM 102 is configured to act as a high-speed cache to hold cached data and Flash memory blocks 128 are configured to act as the system memory to hold un-cached data, e.g., data that is not temporarily stored at IPM 102. In some embodiments, the high-speed cache (IPM 102) includes a first level, a second level, and a third level. FLC module 116 is implemented within SoC 110 and is configured to send programming commands to Flash controller 126 through a standard external interface, such as a Peripheral Component Interconnect Express (PCIe) bus. For example, FLC module 116 communicates with IPM 102 via addressable cache requests to read and write data to IPM 102, and issues programming commands to Flash controller 126 in order to initiate read and write operations to Flash memory blocks 128. In other words, FLC module 116 employs two distinct modes of communications when communicating with IPM 102 and the Flash memory, and must constantly switch between these two modes during operation.

Flash controller 126 includes DMA engine 124 and is configured by SoC 110 to activate Flash memory blocks 128. In some embodiments, Flash controller 126 is configured to receive programming commands from a host memory within SoC 110 (not shown in FIG. 1) to activate the Flash memory blocks 128. In some other embodiments, Flash controller 126 is configured to receive memory-mapped input/output (MMIO) requests directly from FLC 116 at a configuration space of Flash controller 126. The programming commands or the MMIO requests configure one or more registers within the configuration space of Flash controller 126. In response to receiving the programming commands or the MMIO requests, Flash controller 126 is configured to activate DMA engine 124 to initiate transfer of cached data between Flash memory blocks 128 and the host memory within SoC 110. In some embodiments, the host memory within SoC 110 is a SRAM module that facilitates read and write operations from SoC 110 to the Flash units.

Figure 3:
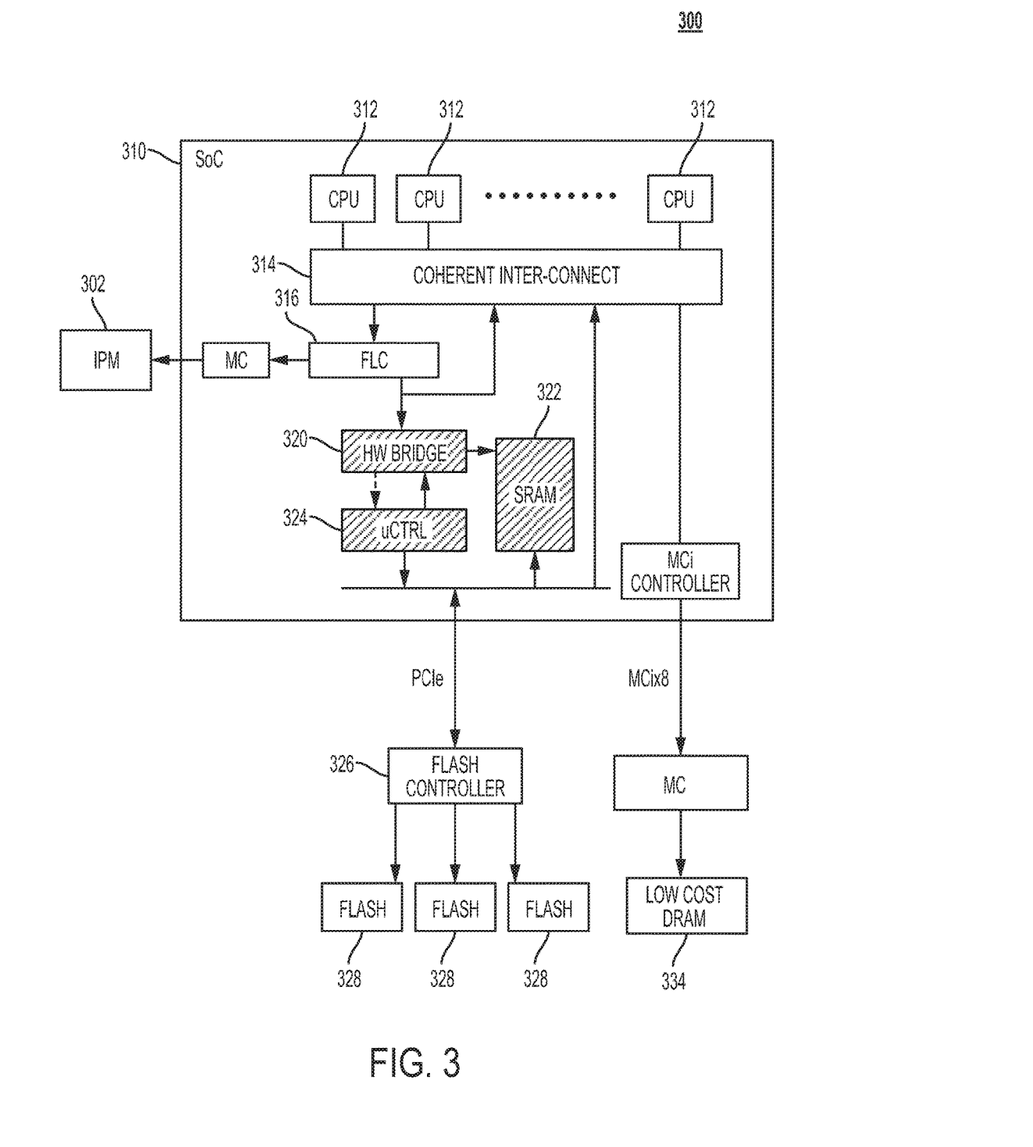
FIGS. 3-4 are block diagrams illustrating FLC-based architectures that implement memories in both DMA and PIO modes, according to some embodiments described herein.
Figure 4:
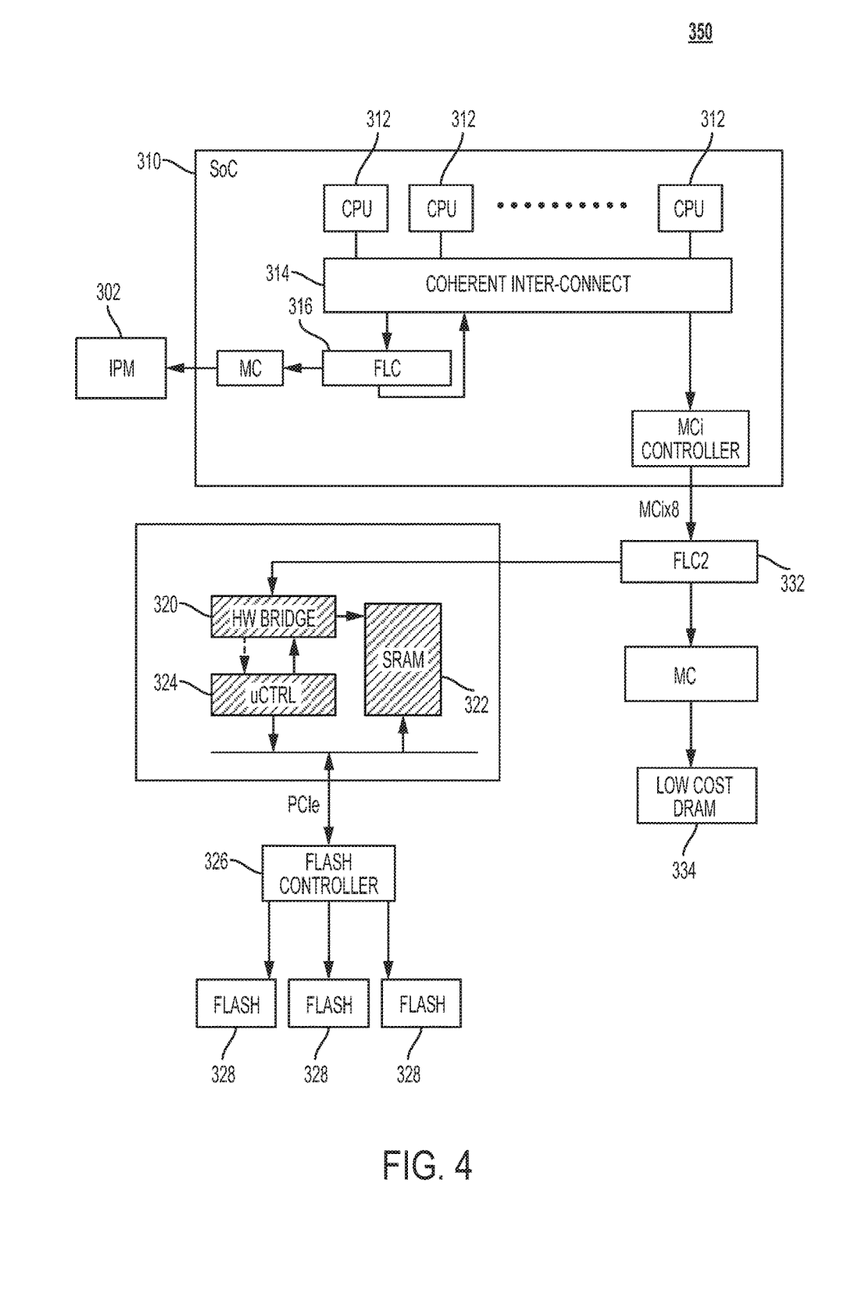

System 100, as shown, operates only with a PIO memory (e.g. Flash) as the system memory. Accordingly, in some embodiments, FLC 116 or a CPU within SoC 110 issues programming commands directly to Flash controller 126 to enable the data transfer, as discussed above. However, if another type of cache is appended to system 100, such as a DRAM, FLC 116 or the CPU would be required to issue both programming commands (e.g., to the Flash, the PIO memory) and addressable cache requests (e.g., to a DRAM, the DMA memory) simultaneously. This creates significant inefficiencies due to the constant context switches between two modes of communications. FIGS. 3-4 below describe bridging components that serve to reduce or eliminate these inefficiencies.

Figure 2:
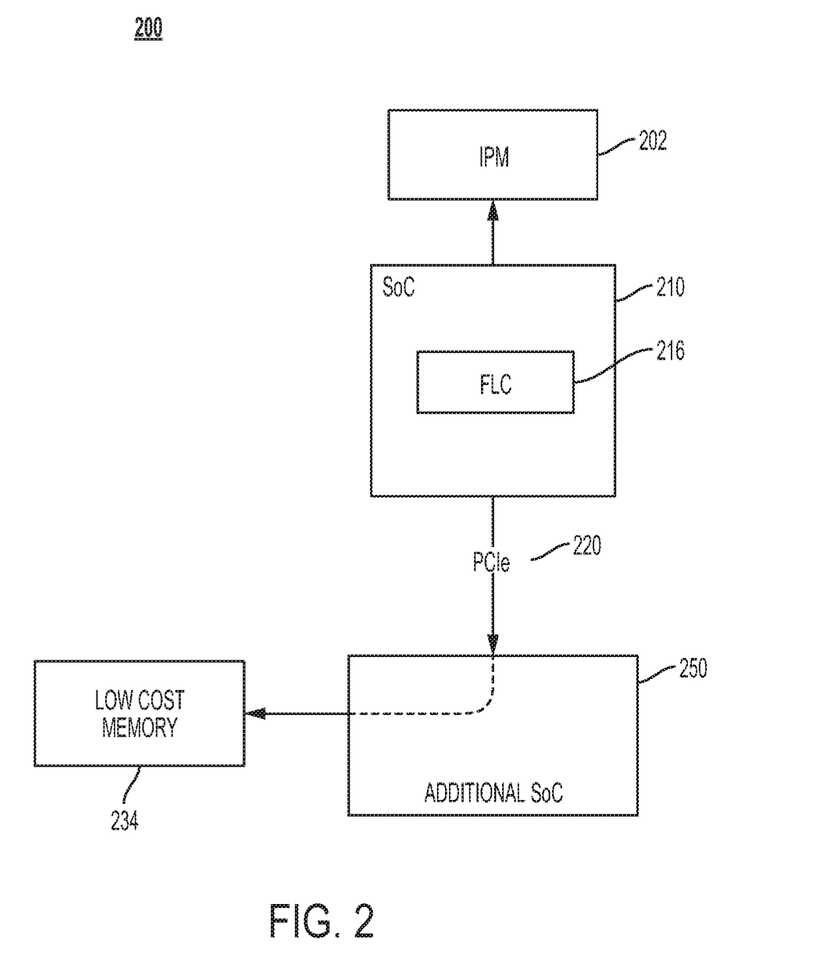
FIG. 2 is a block diagram illustrating an implementation of an FLC-based architecture for communicating with a memory structure in direct memory access (DMA) mode, according to some embodiments described herein.

FIG. 2 shows a block diagram illustrating an implementation of an FLC-based architecture for communicating with a DMA memory, according to some embodiments described herein. Similar to system 100, system 200 includes IPM 202, SoC 210, and FLC 216. Communications between SoC 210 and IPM 202 are conducted in a similar manner as those between SoC 110 (including FLC 116) and IPM 102, because IPMs 102 and 202 both serve to hold cached data (i.e., as the cache memory). However, system 200 replaces the Flash memory with a low cost random access memory 234 (e.g., a DRAM) as the system memory, which is directly addressable by FLC 216 or a CPU within SoC 210. In other words, the CPU in system 200 is configured to access the memory space of low cost random access memory 234 directly, without having to employ a DMA engine such as DMA engine 124 in system 100, which was needed for the Flash memory units. As such, no additional controller is needed in order for SoC 210 to read data from or write data to memory 234.

In some embodiments, one or more additional SoCs 250 is disposed between SoC 210 and low cost memory 234. An additional SoC(s) 250 is configured to connect with SoC 210 via a PCIe bus 220. The one or more SoCs (including SoC 210 or additional SoCs 250) in system 200 are configured to communicate with memory 234 via one or more standard external interfaces, such as PCIe.

As discussed above, in some embodiments, a feature of FLC-based architectures is to implement the caches and memories in multiple tiers. For example, rather than using a single, large DRAM as the system memory, an FLC-based system sometimes implements both a smaller DRAM and a large Flash memory to collectively act as the system memory. Applications that are being processed by the CPU are stored in the small, relatively faster DRAM, while the vast majority of idle applications are stored in the Flash memory. This creates opportunities for significant cost and power savings to the overall system, but requires the FLC module to be able to communicate with both the DRAM and the Flash memory as if they belong to the same memory space.

FIGS. 1-2 demonstrate that, in some embodiments, a SoC is configured to communicate with either a PIO memory (such as the Flash in FIG. 1) or a DMA memory (such as the low cost RAM in FIG. 2). However, incorporating both use cases, i.e., configuring the SoC to communicate with both PIO and DMA memories as if they appear in the same address space remains challenging. As discussed above, this is because communicating with the two different types of memories involves different modes of communications. The present disclosure, as illustrated in FIGS. 3-4, enables FLC-based SoC architectures to be able to send addressable requests to both a PIO memory and a DMA memory, as if they are in the same address space.

FIGS. 3-4 are block diagrams illustrating FLC-based architectures that implement both DMA and PIO memories, according to some embodiments described herein. Like the previous systems, systems 300 and 350 each include IPM 302 and SoC 310. In accordance with some embodiments, such as system 300 shown in FIG. 3, SoC 310 employs a set of bridging hardware, including hardware bridge 320, on-die SRAM 322, and microcontroller 324. In accordance with some other embodiments, the bridging hardware is implemented outside of SoC 310, such as system 350 shown in FIG. 4. The components of bridging hardware—320, 322 and 324—are configured to enable one or more final-level cache modules to communicate with Flash memory 328, DRAM 334, and/or IPM 302 using only addressable requests.

In system 300, one or more processors of CPU 312 communicate with FLC 316 via coherent interconnect 314, and, responsively, FLC 316 issues addressable commands via coherent interconnect 314 to either IPM 302 or DRAM 334, or both. For example, once CPU 312 instructs FLC 316 to retrieve a particular datum, FLC 316 searches for the datum first within IPM 302, and then within DRAM 334, in that order. Similar to the in-package memories in FIGS. 1-2, IPM 302 represents a high-speed cache in system 300 and can be accessed by addressable requests via a memory controller (MC) 304. DRAM 334 represents either a cache or a system memory that is located external to the SoC packaging and can also be accessed by addressable requests via MC 333. Both IPM 302 and DRA 334 are known as DMA memories, that is, they are accessible by FLC 316 (and therefore CPU 312) with direct addressable requests. In some embodiments, the memory controllers, such as MC 304 and MC 333, facilitate memory accesses to the DMA memories.

System 350 of FIG. 4 is largely similar to system 300 of FIG. 3, with the exception that two final-level cache modules—FLC 316 and FLC2 332—are employed instead of a single FLC, and that the bridging hardware is disposed outside of the SoC packaging. In system 350, FLC 316 first attempts to fetch a particular datum from IPM 302, via a memory controller. In the event of a cache-miss at FLC 316, the one or more CPUs turn to FLC2 332 to try to fetch the datum from DRAM 334. If FLC2 332 encounters another cache-miss with DRAM 334, the one or more CPUs direct FLC2 332 to the Flash memories, by way of the bridging hardware, to configure registers in a configuration space and activate the necessary DMA engine(s) (not shown in FIGS. 3-4) for transfer of data. While different embodiments employing either system 300 or system 350 are disclosed in the present invention, subsequent references to "FLC" or "FLC 316" as used herein refers to either FLC 316 alone (as is the case in system 300), or both FLC 316 and FLC2 332 (as is the case in system 350).

As discussed above, Flash memory blocks 328 in system 300 are not directly accessible by FLC 316 or the CPUs, i.e., they are PIO memory. However, FLC 316 that implements the bridging hardware becomes agnostic as to which type of memory the datum is stored in, and will issue the same type of addressable requests to all connected final level caches and system memories. For example, Flash memory blocks 328, low cost DRAM 334, and IPM 302 all receive the same addressable requests from FLC 316 even if Flash memory blocks 328 is not configured for direct memory accesses. To achieve the seamless address space comprised of memories operating in both PIO and DMA modes, the hardware bridge 320 is configured to bridge any addressable requests from FLC 316 to the Flash memory units, as described below in relation to FIGS. 5-6. These implementations offer several advantages.

Figure 5:
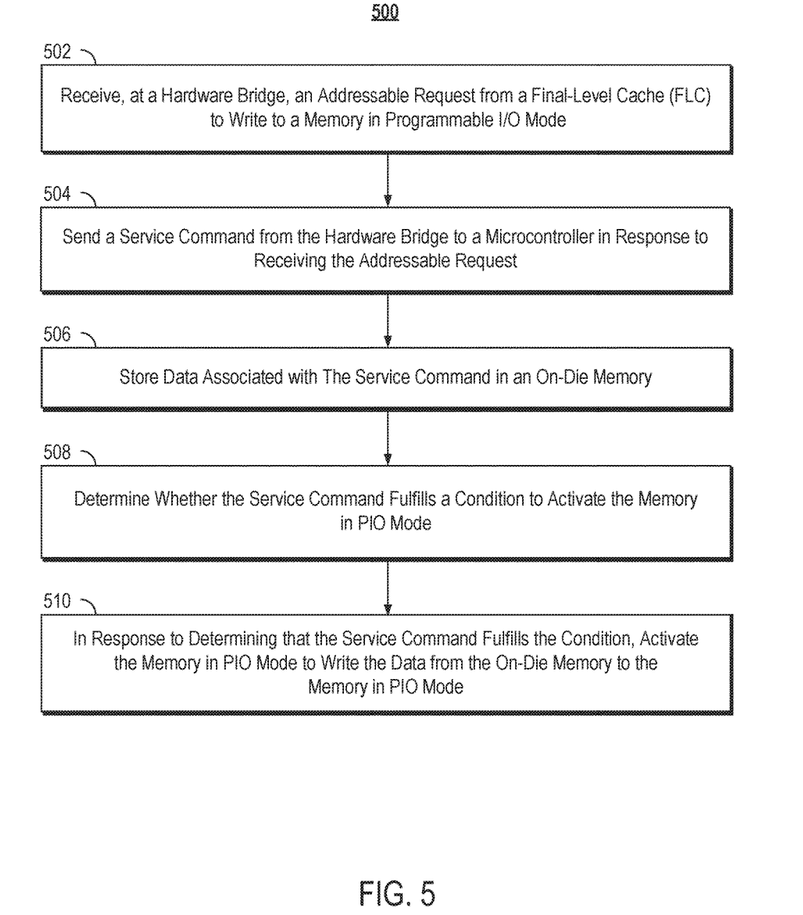
FIG. 5 shows an example logic flow diagram illustrating aspects of writing to a memory structure in PIO mode, according to some embodiments described herein.
Figure 6:
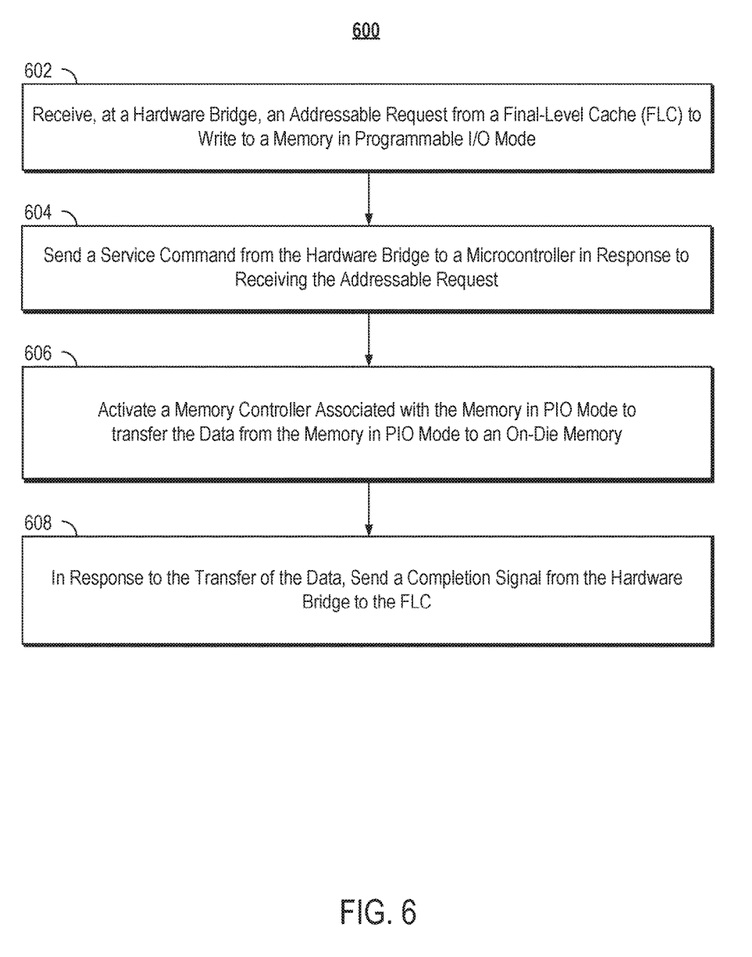
FIG. 6 shows an example logic flow diagram illustrating aspects of reading from a memory structure in PIO mode, according to some embodiments described herein.

First, the operation of FLC 316 becomes decoupled from the specific mode of communication used by a particular type of memory. For example, while Flash controller 326 is configured to accept certain service commands in order to read and write from the connected Flash memory blocks 328, an SSD controller is configured to accept a different set of service commands for its read and write operations with one or more SSDs. Instead of having to reconfigure FLC 316 to accommodate different types of memories with different commands, the bridging hardware translates all addressable requests from FLC 316 into a suitable programming command for the particular driver or DMA engine at hand, and present it as an integrated address space along with any other caches or memories that are part of the FLC-based architecture. Processes 500 and 600 below illustrate examples of such translations performed by the bridging hardware.

Another advantage of the bridging hardware, in accordance with an embodiment, is to implement a memory hierarchy, thereby reducing the cost of the entire system. For example, IPM 302 is implemented with a fast but expensive memory, such as SRAM, while DRAM 334 and Flash memory blocks 328 are implemented with relatively lower-cost memory options. Compared with implementing the entire system in SRAM or DRAM, the overall cost of the memory hierarchy as shown in systems 300 or 350 is much lower without significantly sacrificing the performance of the system. This is because only a small percentage of programs and processes need to be quickly accessed by the CPUs, while a majority of the data, programs, and processes are idle (therefore can be stored in slower memory options, such as Flash).

Yet another advantage of the bridging hardware, in accordance with an embodiment, is to reduce latency in all read or write operations in systems 300 and 350. In view of the relatively slower read and write operations in PIO memories such as Flash, latency is a primary concern when shifting from an all-SRAM cache system to the one described in systems 300 and 350. However, as will be evident from discussions below in relation to FIGS. 5-6, the bridging hardware allows FLC 316 to receive an immediate read or write acknowledgement signal without having to wait for the respective device drivers to complete the read or write operations. This added level of parallelism helps reduce latency in system 300.

In some embodiments, FLC 316 issues both read and write requests in the form of addressable requests to coherent interconnect 314 and hardware bridge 320. Upon receiving an addressable request via the AXI interface, hardware bridge 320 is configured to push the addressable request into a pool of outstanding requests and signal to microcontroller 324 that one or more outstanding addressable requests have been received, and service is needed. When microcontroller 324 is notified that service to hardware bridge 320 is needed, microcontroller 324 is configured to activate Flash controller 326 (or any other non-volatile memory controller), by writing to one or more registers in a configuration space of Flash controller 326, to initiate a read or write operation to its respective memory blocks. During this process, microcontroller 324 is configured to enlist SRAM 322 to temporarily buffer data for the read and write operations, in an embodiment. The buffering of data aggregate data from one or more read or write requests that are directed to the same block within a PIO memory, thereby reducing transaction overhead and latency in the I/O operation. Detailed implementations of the write operation and the read operation will be discussed in relation to FIGS. 5-6 below, respectively.

FIG. 5 shows an example logic flow diagram illustrating aspects of bridging an addressable write request to a PIO memory, according to some embodiments described herein. As discussed above, FLC 316 issues addressable requests (for both read and write requests) via an AXI interface to coherent interconnect 314 and to hardware bridge 320. Process 500 begins at 502, where hardware bridge 320 receives an addressable request from FLC 316 to write to Flash memory blocks 328 at a particular address. In some embodiments, this particular address might be a virtual address having a format in the same address space as that of a DMA memory, such as DRAM 334, from the perspective of FLC 316. At 504, upon receiving the addressable request, hardware bridge 320 sends a service (i.e., write) command to microcontroller 324. At 506, microcontroller 324 gathers data from multiple write commands and stores them in on-die SRAM 322. As discussed above, microcontroller 324 buffers multiple write commands in SRAM 322 in order to reduce the number of write operations to Flash memory blocks 328. For example, write operations to Flash memory blocks 328 must be conducted in blocks of 256 KB. Therefore, microcontroller 324 buffers, in SRAM 322, multiple 4 KB write operations that are to be written to the same 256 KB block in Flash, so that only a single write operation would be necessary.

Process 500 continues to 508, where microcontroller 324 determines whether the service command fulfills a condition that is needed to activate the Flash memory (i.e., Flash memory blocks 328). For instance, the condition is fulfilled when enough data from the write commands has been gathered to fill one Input/Output (I/O) block of the PCIe bus. As another example, the condition is fulfilled when a countdown timer has timed out, i.e., when enough time has elapsed sine the first write command is received. While buffered data and timeout are two examples of the condition as discussed above, they are by no means limiting. Any suitable condition for activating the Flash memory is contemplated without exceeding the scope of the present disclosure.

At 510, in response to determining that the condition is fulfilled, the microcontroller is configured to activate the Flash memory units (including Flash controller 326 and Flash memory blocks 328). In some embodiments, the activation of the Flash memory units involves microcontroller 324 writing to one or more registers in a configuration space of Flash controller 326, followed by Flash controller 326 reading the data to be written from on-die SRAM 322 and writing the data to a location within Flash memory blocks 328. The location within Flash memory blocks corresponds to the virtual address as instructed by FLC 316.

Because it takes a considerable amount of time for microcontroller 324 to write to the configuration space of Flash controller 326, and for Flash controller 326 to transfer data from on-die SRAM 322 to Flash memory blocks 328, process 500 allows hardware bridge 320 to promptly provide a acknowledgement signal to FLC 316, even before the data transfer is completed. In particular, in an embodiment, hardware bridge 320 employs a lookup mechanism that provides a serialized read of the location within Flash memory blocks 328 immediately after the write operation is completed, without having to involve FLC 316. For example, hardware bridge 320 is configured to receive the initial addressable (write) request from FLC 324 and automatically provide a acknowledgement signal to FLC 324 to acknowledge the addressable (write) request, even before the write command has been completely executed by microcontroller 324 and the memory controller. This acknowledgement signal notifies FLC 324 that its addressable (write) request is being handled by the bridging hardware, and no further computational power needs to be expended to ensure the completion of the write operation. Hardware bridge 320 achieves this by sending out a read command, by default, to microcontroller 324 immediately in response to issuing the write command, without further instructions from FLC 316. This way, hardware bridge 320 independently ensures the completion of the write operation (by reading the data immediately after it is written) in parallel with the normal operation of the CPU and FLC 324. Through this level of parallelism, process 500 significantly reduces latency in the PIO memories despite the fact that they take longer time to complete.

FIG. 6 shows an example logic flow diagram illustrating aspects of bridging an addressable read request from a PIO memory, according to some embodiments described herein. Similar to the write operation in process 500, process 600 begins at 602, where hardware bridge 320 receives an addressable request from FLC 316 to read data from the Flash memory units (including Flash controller 326 and Flash memory blocks 328). At 604, hardware bridge 320 sends a service (i.e., read) command to microcontroller 324 in response to receiving the addressable request, in an embodiment. At 606, microcontroller 324 activates Flash controller 326 to read from Flash memory blocks 328 at a particular address. In some embodiments, the particular address is a virtual address that corresponds to one or more locations within Flash memory blocks 328. Microcontroller 324 is configured to further direct Flash controller 326 to write the data from the one or more locations to a designated location in on-die SRAM 322.

Flash controller 326 is configured to indicate to microcontroller 324 that the transfer is completed when the data is written to on-die SRAM 322, in an embodiment. This prompts microcontroller 324 to write to a register in a configuration space within hardware bridge 324 to indicate the location of the fetched data (i.e., the read data). Thereafter, at 608, in response to the transfer of the read data, hardware bridge 320 completes the transaction by providing a read response to FLC 316 via the AXI interface. This read response serves as a completion signal to indicate that the transaction is complete.

While various embodiments of the present disclosure have been shown and described herein, it is noted that such embodiments are provided by way of example only. Numerous variations, changes, and substitutions will now occur to those skilled in the art without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, it is noted that such operations are not necessarily performed in the particular order shown or in sequential order, or that all illustrated operations need to be performed, to achieve the desirable results. In certain circumstances, multitasking and parallel processing may be advantageous. Moreover, the separation of various system components in the aspects described above should not be understood as requiring such separation in all aspects.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method for communicating an addressable request from cache circuitry to a cache memory, the method comprising:
   receiving, at a hardware bridge coupled to the cache circuitry, the addressable request directed to the cache memory, wherein the cache memory includes a direct memory access (DMA) memory and a programmable input/output (PIO) memory operable within a same address space of the cache circuitry; and
   when the addressable request is addressed to the PIO memory: translating the addressable request in the hardware bridge into a PIO service command;
   sending the PIO service command, translated from the addressable request, from the hardware bridge to a microcontroller; and
   in response to receiving the PIO service command, activating the PIO memory by the microcontroller, by:
   transferring write data from an on-die memory to the PIO memory when the PIO service command is a write command, and transferring read data from the PIO memory to the on-die memory when the PIO service command is a read command.

2. The method of claim 1, wherein receiving the addressable request from the cache circuitry further comprises receiving the addressable request from a final-level cache; and the method further comprising:
temporarily storing the read data or the write data in the on-die memory to reduce latency in data transfer, wherein the on-die memory is a static random access memory coupled to the hardware bridge and the microcontroller.

3. The method of claim 1, further comprising aggregating a plurality of addressable requests from the cache circuitry into a pool of outstanding addressable requests, wherein the plurality of addressable requests are associated with data within a same block of the PIO memory.

4. The method of claim 1, when the PIO service command is the write command, further comprising:
storing, with the microcontroller, the write data in the on-die memory;
determining whether the write command fulfills a condition to activate the PIO memory; and
in response to determining that the condition is fulfilled, sending an acknowledgement signal from the hardware bridge to the cache circuitry.

5. The method of claim 4, further comprising:
communicating the addressable request and the acknowledgement signal between the hardware bridge and the cache circuitry on an AXI interface.

6. The method of claim 4, further comprising:
determining that the condition to activate the PIO memory is fulfilled when sufficient data has accumulated for an Input/Output (I/O) block or when a timeout is met.

7. The method of claim 4, further comprising:
sending another read command from the hardware bridge to the microcontroller in response to transferring the write data to the PIO memory; and
sending a write response from the hardware bridge to the cache circuitry prior to the write data being completely transferred to the PIO memory.

8. The method of claim 1, when the PIO service command is the read command, further comprising:
retrieving, with a PIO memory controller, the read data from the PIO memory; and
writing, with the microcontroller, the read data to a designated location within the on-die memory.

9. The method of claim 8, further comprising:
receiving a signal at the microcontroller from the PIO memory controller, wherein the signal indicates completion of the transfer; and
writing to a register of the hardware bridge to indicate the completion of the transfer.

10. The method of claim 1, further comprising:
determining that the addressable request is directed to the PIO memory based at least in part on a memory address included in the addressable request, wherein the DMA memory is a dynamic random access memory and the PIO memory is a Flash memory.

11. A bridging module within a System-on-Chip (SoC) for communicating an addressable request from cache circuitry to a cache memory, the bridging module comprising:
an on-die memory configured to store read data or write data; and
a hardware bridge configured to:
receive an addressable request from the cache circuitry within the SoC to the cache memory, wherein the cache memory includes a direct memory access (DMA) memory and a programmable input/output (PIO) memory operable within a same address space of the cache circuitry; and
when the addressable request is addressed to the PIO memory:
translate the addressable request in the hardware bridge into a PIO service command; and
send the PIO service command, translated from the addressable request, to a microcontroller;
wherein:
the microcontroller is configured to activate the PIO memory in response to receiving the PIO service command, by:
transferring write data from the on-die memory to the PIO memory when the PIO service command is a write command, and
transferring read data from the PIO memory to the on-die memory when the PIO service command is a read command.

12. The bridging module of claim 11, wherein the cache circuitry is a final-level cache configured to communicate with multiple memories within the same address space, wherein the on-die memory is a static random access memory coupled to the hardware bridge and the microcontroller, and wherein the on-die memory is further configured to temporarily store the read data and the write data to reduce latency in data transfer.

13. The bridging module of claim 11, wherein the hardware bridge is further configured to aggregate a plurality of addressable requests from the cache circuitry into a pool of outstanding addressable requests, wherein the plurality of addressable requests are associated with data within a same block of the PIO memory.

14. The bridging module of claim 11, wherein, when the PIO service command is the write command: the microcontroller is further configured to:
store the write data in the on-die memory; and
determine whether the write command fulfills a condition to activate the PIO memory; and
the hardware bridge is further configured to send an acknowledgement signal to the cache circuitry in response to the microcontroller determining that the condition is fulfilled.

15. The bridging module of claim 14, wherein the first addressable request and the acknowledgement signal are communicated between the hardware bridge and the cache circuitry on an AXI interface.

16. The bridging module of claim 14, wherein the condition to activate the PIO memory is fulfilled when sufficient data has accumulated for an Input/Output (I/O) block or when a timeout is met.

17. The bridging module of claim 14, wherein the hardware bridge is further configured to:
send another read command to the microcontroller in response to the microcontroller transferring the write data to the PIO memory; and
send a write response to the cache circuitry prior to the write data is completely transferred to the non-direct-addressable memory.

18. The bridging module of claim 11, when the PIO service command is the read command, further comprising:
a PIO memory controller configured to retrieve the read data from the PIO memory; and
wherein the microcontroller is further configured to write the read data to a designated location within the on-die memory.

19. The bridging module of claim 18, wherein the microcontroller is further configured to:
   receive a signal from the PIO memory controller, wherein the signal indicates completion of the transfer; and
   write to a register of the hardware bridge to indicate the completion of the transfer.

20. The bridging module of claim 11, wherein the microcontroller is further configured to determine that the addressable request is directed to the PIO memory based at least in part on a memory address included in the addressable request, and wherein the DMA memory is a dynamic random access memory and the PIO memory is a Flash memory.

* * * * *